US012217522B2

(12) United States Patent
Sickert

(10) Patent No.: US 12,217,522 B2
(45) Date of Patent: *Feb. 4, 2025

(54) IMAGE CLASSIFICATION USING COLOR PROFILES

(71) Applicant: Capital One Services, LLC, McLean, VA (US)

(72) Inventor: Thomas Sickert, Los Angeles, CA (US)

(73) Assignee: Capital One Services, LLC, McLean, VA (US)

( * ) Notice: Subject to any disclaimer, the term of this patent is extended or adjusted under 35 U.S.C. 154(b) by 397 days.

This patent is subject to a terminal disclaimer.

(21) Appl. No.: 17/664,284

(22) Filed: May 20, 2022

(65) Prior Publication Data

US 2022/0277574 A1 Sep. 1, 2022

Related U.S. Application Data

(63) Continuation of application No. 16/836,388, filed on Mar. 31, 2020, now Pat. No. 11,341,759.

(51) Int. Cl.
| G06T 7/90 | (2017.01) |
| G06F 18/22 | (2023.01) |
| G06T 7/11 | (2017.01) |
| G06V 10/56 | (2022.01) |
| G06V 30/413 | (2022.01) |

(52) U.S. Cl.
CPC .......... G06V 30/413 (2022.01); G06F 18/22 (2023.01); G06T 7/11 (2017.01); G06T 7/90 (2017.01); G06V 10/56 (2022.01)

(58) Field of Classification Search
CPC ............ G06V 30/413; G06V 10/56; G06V 30/18105; G06V 10/26; G06V 30/148; G06F 18/22; G06T 7/11; G06T 7/90; G06T 7/10; G06T 7/12; G06T 2207/20112

See application file for complete search history.

(56) References Cited

U.S. PATENT DOCUMENTS

| 6,801,657 | B1 | 10/2004 | Cieplinski |
| 10,666,862 | B2 | 5/2020 | Thurow et al. |
| 11,341,759 | B2 * | 5/2022 | Sickert ..................... G06T 7/90 |
| 2002/0102018 | A1 | 8/2002 | Lin et al. |
| 2005/0207643 | A1 | 9/2005 | Lee et al. |
| 2007/0122031 | A1 | 5/2007 | Berriss et al. |
| 2010/0284610 | A1 | 11/2010 | Yoshikawa |

(Continued)

Primary Examiner — Duy M Dang
(74) Attorney, Agent, or Firm — Harrity & Harrity, LLP

(57) ABSTRACT

A device may receive a target document. The device may segment the target document into multiple segments. The device may determine, for each segment of the multiple segments, a set of color parameters for a corresponding set of pixels included in that segment. The device may determine, for each segment of the multiple segments, an average color parameter for that segment based on the set of color parameters for the corresponding set of pixels included in that segment. The device may generate a target color profile for the target document based on determining the average color parameter for each segment. The device may compare the target color profile and a model color profile associated with classifying the target document. The device may classify the target document based on comparing the target color profile and the model color profile.

20 Claims, 10 Drawing Sheets

(56) References Cited

U.S. PATENT DOCUMENTS

| | | |
|---|---|---|
| 2015/0279047 A1 | 10/2015 | Zia et al. |
| 2016/0179446 A1* | 6/2016 | Arnabat Benedicto ..................... G06V 10/56 358/1.15 |
| 2017/0116765 A1 | 4/2017 | Chamaret et al. |

* cited by examiner

IMAGE CLASSIFICATION USING COLOR PROFILES

RELATED APPLICATION

This application is a continuation of U.S. patent application Ser. No. 16/836,388, filed Mar. 31, 2020 (now U.S. Pat. No. 11,341,759), which is incorporated herein by reference in its entirety.

BACKGROUND

Image processing involves performing various operations or processing techniques on images. Image processing may allow users to manipulate images, analyze images, extract information from images, and/or the like. Image processing may allow users to more efficiently and effectively analyze and use images.

SUMMARY

According to some implementations, a method may include receiving, by a device, a target document; segmenting, by the device, the target document into multiple segments, wherein each of the multiple segments includes multiple pixels; determining, by the device and for each segment of the multiple segments, a set of color parameters for a corresponding set of pixels included in that segment; determining, by the device and for each segment of the multiple segments, an average color parameter for that segment based on the set of color parameters for the corresponding set of pixels included in that segment; generating, by the device, a target color profile for the target document based on determining the average color parameter for each segment, wherein the target color profile includes a set of average color parameters corresponding to a set of segments of the multiple segments; comparing, by the device, the target color profile and a model color profile associated with classifying the target document, wherein the model color profile includes one or more model sets of average color parameters associated with corresponding segments for document classification; and classifying, by the device, the target document based on comparing the target color profile and the model color profile.

According to some implementations, a device may include one or more memories; and one or more processors, communicatively coupled to the one or more memories, configured to: identify a target image; segment the target image into multiple segments; determine a set of color parameters associated with a set of pixels included in a segment of the multiple segments; determine an average color parameter for the segment based on the set of color parameters associated with the set of pixels included in the segment; generate a target color profile for the target image based on determining the average color parameter for the segment, wherein the target color profile includes one or more average color parameters corresponding to one or more segments of the multiple segments; compare the target color profile and a model color profile associated with a document type, wherein the model color profile includes one or more model sets of average color parameters, and wherein each model set of average color parameters includes a plurality of average color parameters corresponding to a plurality of segments of a document having the document type; and classify the target image as having the document type or not having the document type based on comparing the target color profile and the model color profile.

According to some implementations, a non-transitory computer-readable medium may store one or more instructions. The one or more instructions, when executed by one or more processors of a device, may cause the one or more processors to: receive a target document; partition the target document into multiple segments; determine a set of color parameters associated with a set of pixels included in a segment of the multiple segments; determine an average color parameter for the segment based on the set of color parameters associated with the set of pixels included in the segment; generate a target color profile for the target document based on determining the average color parameter for the segment, wherein the target color profile includes one or more average color parameters corresponding to one or more segments of the multiple segments; compare the target color profile and a model color profile, wherein the model color profile includes one or more model sets of average color parameters, and wherein each model set of average color parameters includes a plurality of average color parameters corresponding to a plurality of segments of a document; and selectively perform an action based on comparing the target color profile and the model color profile.

DETAILED DESCRIPTION

Figure 1A:
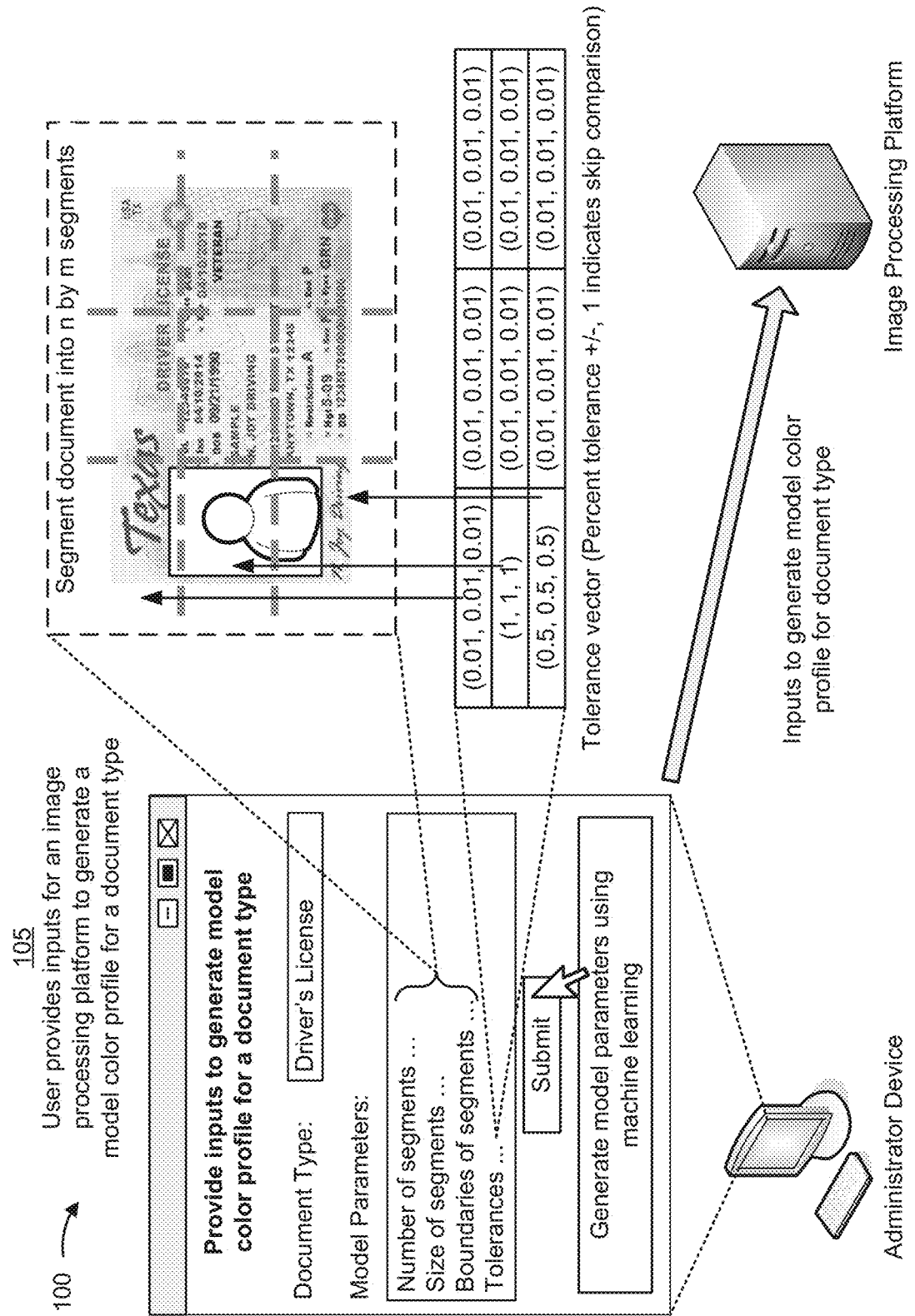
FIGS. 1A-1E are diagrams of one or more example implementations described herein.

The following detailed description of example implementations refers to the accompanying drawings. The same reference numbers in different drawings may identify the same or similar elements.

Image processing involves performing one or more operations (e.g., applying algorithms) on an image to assist with processing the image. Image processing may assist users with analyzing and manipulating images, as well as extracting data from images. In some cases, users may use image processing techniques on images of documents. For example, optical character recognition techniques may help users convert paper documents to digital documents with searchable text. Other image processing techniques may allow users to extract particular text from images of documents of a particular type (e.g., extracting names from drivers' licenses, extracting particular fields from W-2 forms, and/or the like). This, along with other image processing techniques, may aid users in document management, such as archiving or organizing documents in bulk.

However, image processing for documents may be a time consuming and computer resource intensive process. Current image processing techniques may be inefficient because irregularities and inconsistencies across images prevent the correct application of image processing techniques. That is, general image processing techniques, while generally effective on documents of the same type with little variance, may be ineffective when confronted with irregular cases. This may lead to a reduction in effectiveness of processing documents in bulk where there is a chance of irregularities.

For example, if a process was designed to extract information from a particular type of document or image (e.g., a Virginia driver's license), images or documents of a different type (e.g., a Maryland driver's license) may interrupt the process's effectiveness. For example, a different state driver's license may result in an incorrect name being added to a database of Virginia drivers' licenses, may stall the process because of difficulty in parsing a different document type for information, and/or the like. Irregularities may not just be limited to different documents but may also extend to documents of the same type but different quality (e.g., poorly scanned images or images with low resolution may also create difficulties in image processing). The variability of text, quality, and/or the like across images therefore may create difficulty in using efficient, standardized image processing. More sophisticated processes may result in greater accuracy, but at the expense of greater computing resources being used to execute additional processes to verify the accuracy of a document. This may lead to slow processing times, along with inaccuracies (e.g., extracting wrong information from a document, extracting information from a wrong type of document, and/or the like), or additional wasted time and/or resources associated with identifying, diagnosing, and remedying the inaccuracies.

In addition, the advent of advanced computerized techniques, such as machine learning and deep learning, has led to the rise of integration of these techniques in many fields, includes image processing. However, machine learning techniques may require suitable images for both the training and classifying aspects of machine learning. Irregularities may interfere with the training and classifying aspects. For example, irregularities may result in training the machine learning algorithm in an inefficient manner, because the machine learning algorithm is being trained on a nonsuitable document. In addition, sophisticated machine learning algorithms may take a long time to train and a long time to run when irregular documents are included in a set of documents to process, since the machine learning algorithms cannot quickly determine how to manage the irregularities. This may result in wasted computing resources with retraining the algorithm with suitable documents.

Preprocessing techniques may assist in removing unnecessary images to help the efficacy of image processing. For example, preprocessing techniques may involve filtering out all documents that are not of a particular type. In this way, preprocessing techniques allow sophisticated computerized techniques to be applied on a regular batch of documents without latencies due to attempts to process irregular documents. However, current methods may not result in efficiency or accuracy of eliminating correct documents in the preprocessing stage, because of the great variability available in images uploaded for image processing (e.g., mixed quality images, different document types, and/or the like).

Some implementations described herein may improve the efficiency and efficacy of document processing by allowing users to process images using color recognition with segmented documents in different orientations. This may more quickly narrow down documents to be used as candidates for more sophisticated algorithms, such as deep machine learning algorithms in training or classifying documents. The use of color allows an improved way of identifying differences between documents (e.g., distinguishing between identification cards of different states), without requiring significant changes in processing power. Through an improved preprocessing step, some implementations described herein may conserve computing resources (e.g., processor resources, memory resources, communication resources, and/or the like) that would otherwise be wasted in additional processing steps (e.g., sophisticated machine learning algorithms), that may be inefficient at processing irregular documents. In addition, through improved accuracy of filtering out unnecessary documents, some implementations described herein may conserve computing resources (e.g., processor resources, memory resources, communication resources, and/or the like) that would otherwise be wasted in identifying faulty or irregular results from image processing steps (e.g., pulling a name from a wrong type of document). For example, computing resources that may otherwise have been used in executing additional processes to identify a cause of a faulty or irregular result may no longer be used, because of the reduction or elimination of the results (e.g., wrong documents are no longer processed for information). Additionally, or alternatively, some implementations described herein may conserve computing resources that would otherwise have been used in remediating faulty or irregular results. For example, memory resources that would otherwise have been used in recovering data, processing resources that would otherwise have been used in updating an image processing system or computer system because of the irregular results may be conserved because of the reduction in irregular results.

FIGS. 1A-1E are diagrams of one or more example implementations 100 described herein. For example, example implementation(s) 100 may include an administrator device, an image processing platform, and a user device.

As shown in FIG. 1A, and by reference number 105, a user may provide inputs to generate a model color profile for a document type. The inputs may be sent to an image processing platform for the image processing platform to generate the model color profile. The model color profile may be used to distinguish documents, of the document type that the model color profile is associated with, from documents of a different type. For example, if a target document has a similar color profile to the model color profile, the target document may be classified as the same document type as the document type associated with the model color profile.

The model color profile may be generated by dividing a document into a number of segments and analyzing each segment for a set of average color parameters. The average color parameters may be expressed in a way related to a color space, a color model, and/or the like to describe the makeup of colors in a segment. For example, common color models, such as an RGB (red, green, and blue) color model, a CMYK (cyan, magenta, yellow, and black) color model, a CIE (International Commission on Illumination) color model, a YUV color model (e.g., a color model with a luma attribute and two chrominance attributes), an HSL (hue, saturation, lightness) color model, an HSV (hue, saturation, value) color model and/or the like, may be used to describe an average color parameter for each segment. This may result in different order tensors (e.g., a third order tensor for RGB color values: (255, 0, 0), a fourth order tensor for CMYK color values: (15, 75, 0, 45), and/or the like). An average color parameter may be generated by taking the average color value of all the pixels in a segment, as expressed through a color model or color space. For example, if a segment includes only red pixels, the resulting average color parameter may be (255, 0, 0) using an RGB color model.

The user may provide a variety of inputs to assist in generating the model color profile. For example, the user may provide inputs classifying the document type associated with the model color profile to be generated. For example, the user may input a string indicating that the document type is a "W-2 Form," a "Virginia Driver's License," and/or the like. Additionally, or alternatively, image processing may be used to extract information from a model document to identify the document type. For example, image processing techniques, such as optical character recognition, may be used to convert text, and another image processing technique may be used to identify a title associated with an image (e.g., extracting a first line of text associated with an image, extracting the largest text associated with the image, and/or the like). In some implementations, artificial intelligence techniques, machine learning techniques, deep learning techniques, and/or the like may be used to extract a document type from a set of model documents provided.

In some implementations, the user may provide model parameters to assist with segmentation. By segmenting the document into n x m segments, where a set of color parameters may be generated for each segment, special colorized parts of a document may provide accurate indicators of what the document type is. For example, on a state driver's license, a portion of the state driver's license with an identification photo may have a varied color profile across different drivers' licenses from the same state due to a great variability in photo colorization that results from photos of different people. However, the left-hand corner of the state driver's license may have the same colorized mark for all versions of the state driver's license (e.g., Virginia driver's licenses may all have a purple "Virginia" labeled on the upper left-hand section of the card). This same colorized mark may differentiate the state driver's license from other state driver's licenses (e.g., a District of Columbia License has a red "Washington, D.C." in the upper left-hand section of the card).

Therefore, the segmentation may allow the user to indicate which parts of a document may have color information that is the same across all documents of the same type and/or which parts of a document may have color information that is different across all documents of the same type. The user may provide various inputs to assist with segmentation, such as inputting a number of segments, a size of segments, boundaries of segments, and/or the like. For example, the user may input a greater number of segments if smaller-sized segments would be beneficial.

In some implementations, the user may input a tolerance vector for each segment. The tolerance vector may indicate how much of a variance away from the model color profile a target color profile is permitted to have to still be considered a match to the particular document type that the model color profile is associated with. The tolerance vector may be of the same order as the color model used (e.g., a third order vector for an RGB color model). For example, in the driver's license photo example, segments associated with the driver's license photo may be associated with a high tolerance vector (e.g., (1,1,1)), to account for wide variability in color across different driver's license photos. Additionally, or alternatively, segments associated with special colorized symbols on a document may have a small tolerance (e.g., (0.01, 0.01, 0.01)) because the color model should be the same across all documents of the same type. A medium tolerance range (e.g., (0.5, 0.5, 0.5)) may be used for mixed areas that may include uniform portions of a document along with variable areas of documents, and/or the like.

In some implementations, machine learning methods may be used to determine, adjust, finetune, and/or the like the model parameters for a model color profile. In some implementations, the parameters may be determined using user input, machine learning, image processing from an image repository, a combination of the previously mentioned methods, and/or the like. For example, the image processing platform may train a model using historical data associated with a document type (e.g., past model parameters input by users for a particular document, past model parameters determined by the image processing platform using image processing techniques, and/or the like). The trained model may be used to determine, adjust, finetune, and/or the like the model parameters for the model color profile.

Figure 1B:
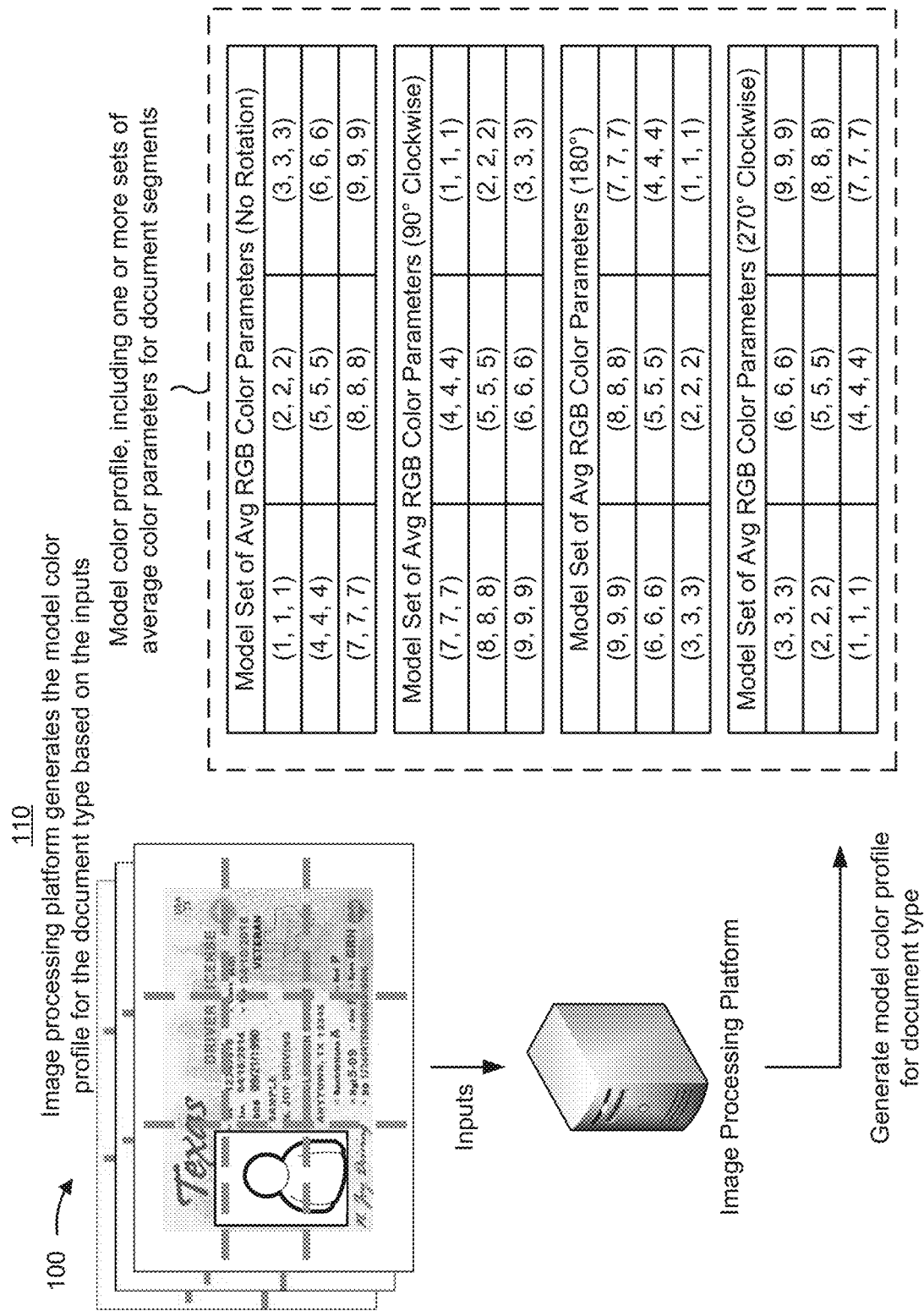

As shown in FIG. 1B, and by reference number 110, the image processing platform may generate a model color profile for the document type based on the inputs. The image processing platform may segment the document based on the inputs. As described above, the model color profile may include one or more sets of average color parameters for document segments. In some implementations, the model color profile may include one or more model sets of average color parameters for one or more orientations, views, and/or the like of the document. For example, a model color profile may include one or more sets of average color parameters for documents segments of a regular view, a view of 90 degrees clockwise, a view of 180 degrees clockwise, a view of 270 degrees clockwise, and/or the like. In this way, if an image is in a different orientation, the image may be compared with a model color profile from multiple different orientations to ensure the target document is not wrongly filtered out.

In some implementations, the model color profile may be generated by processing a model document associated with the document type. For example, the image processing platform may analyze the model document for average color parameters in each segment. In some implementations, the user may input average color parameters associated with one or more segments. The model color profile may contain one or more model sets of average color parameters.

The model color profile, in addition to the tolerance vector, may create a matching condition. The matching condition may be used to distinguish documents of a different type than that which is associated with the model color profile. In some implementations, in order to satisfy the matching condition, every average color parameter from a target document should be within a respective threshold tolerance of a corresponding average color parameter included in a model set of average color parameters of the model color profile. The matching condition may relate to particular segments being processed, a number of segments being processed, and/or the like. For example, the matching condition may require all average color parameters across all segments to be within a respective threshold tolerance of a corresponding average color parameter included in a model set of average color parameters. In some implementations, the matching condition may require average color parameters across a threshold of segments to be within a respective threshold tolerance of a corresponding average color parameter included in a model set of average color parameters.

Figure 1C:
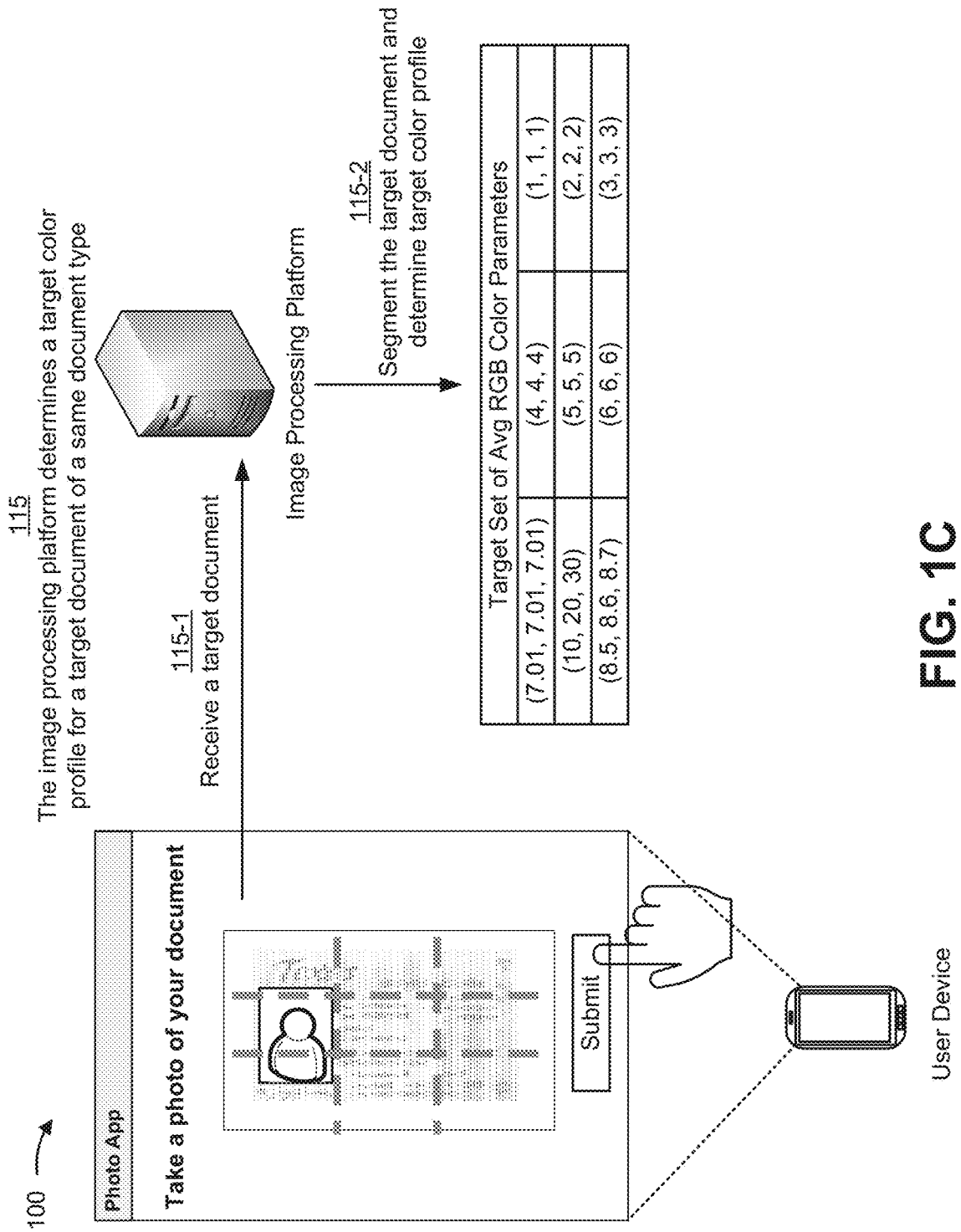

As shown in FIG. 1C, and by reference number 115, the image processing platform may determine a target color profile for a target document of the same document type as the document type associated with the model color profile. As shown in FIG. 1C, and by reference number 115-1, the user may submit, using a user device, a target document, of the same type as the document type associated with the model color profile, to be sent to the image processing platform. The user may use an image capture device (e.g., a camera phone, a scanner, and/or the like) to capture an image of the target document. The user device may capture the image in any one of various orientations. For example, the user may submit a driver's license in a view of 90 degrees clockwise than an upright position. In some implementations, rather than the user device capturing an image of the target document and sending that image to the image processing platform, the image processing platform may obtain the target document from an image storage device.

As shown in FIG. 1C, and by reference number 115-2, the image processing platform may segment the target document and determine a target color profile. The target color profile may be of a similar or same type as the model color profile. The target document may be segmented in a similar way to the model color profile, such as through using the inputs from FIG. 1A. The image processing platform may analyze the target color profile by analyzing each segment for an average color parameter. For example, the image processing platform may determine a color profile for each pixel in a segment and determine an average color parameter based on all the pixels in the segment. The target color profile may use the same color model as of the model color profile (e.g., an RGB color model, a CMYK color model, a CIE color model, a YUV color model, an HSL/HSV color model, and/or the like).

Figure 1D:
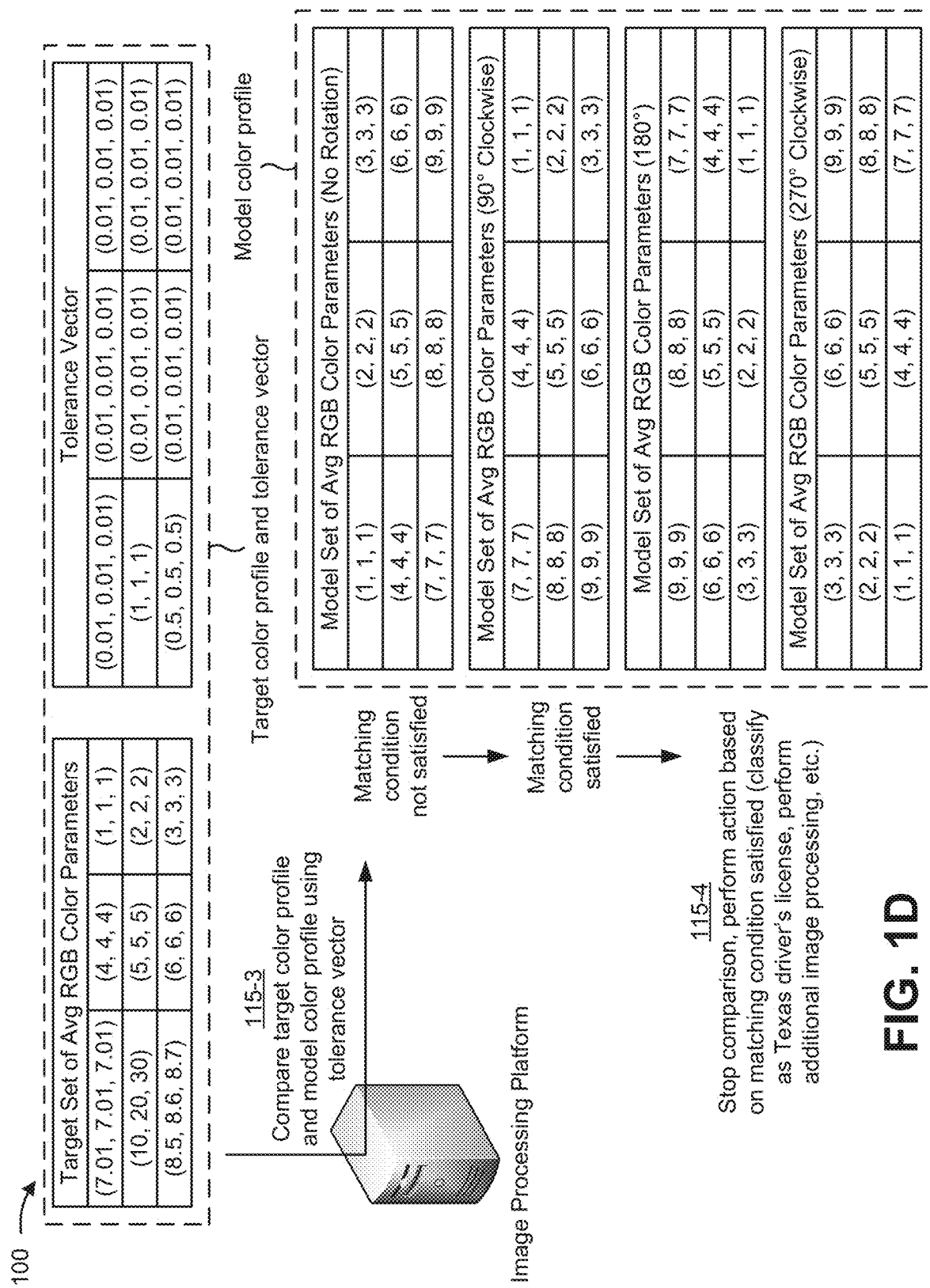

As shown in FIG. 1D, and by reference number 115-3, the image processing platform may compare the target color profile and the model color profile using the tolerance vector. As detailed before, the tolerance vector may include values that are larger to indicate a greater tolerance for different values, or values that are smaller to indicate a smaller tolerance for different values. For example, the image processing platform may compare the average color parameters of a segment in a target color profile and the average color parameters of a corresponding segment in the model color profile. If the value is within a particular tolerance of the model color profile (e.g., +/−0.1), the image processing platform may find a matching condition to be satisfied. The image processing platform may compare a corresponding segment, multiple corresponding segments, and/or the like to determine whether a matching condition is met. The image processing platform may compare the target color profile and the model color profile in various orientations. For example, the image processing platform may compare the target color profile with a model set of average color parameters associated with an orientation of no rotation. If the model set associated with no rotation does not satisfy a matching condition, the image processing platform may compare the target color profile to a model set of a different orientation, such as 90 degrees clockwise from upright orientation. The image processing platform may continue comparing different orientations if the matching condition is not satisfied.

As shown in FIG. 1D, and by reference number 115-4, if a matching condition is satisfied, the image processing platform may stop the comparison and perform an action based on the matching condition being satisfied. For example, the image processing platform may classify a document with a particular document type (e.g., the document type that is associated with the model color profile). Additionally, or alternatively, the image processing platform may perform additional image processing. For example, the image processing platform may perform more sophisticated algorithms to extract data from the target document, and/or the like. In some implementations, the image processing platform may store the target document in a particular database based on the classification.

Figure 1E:
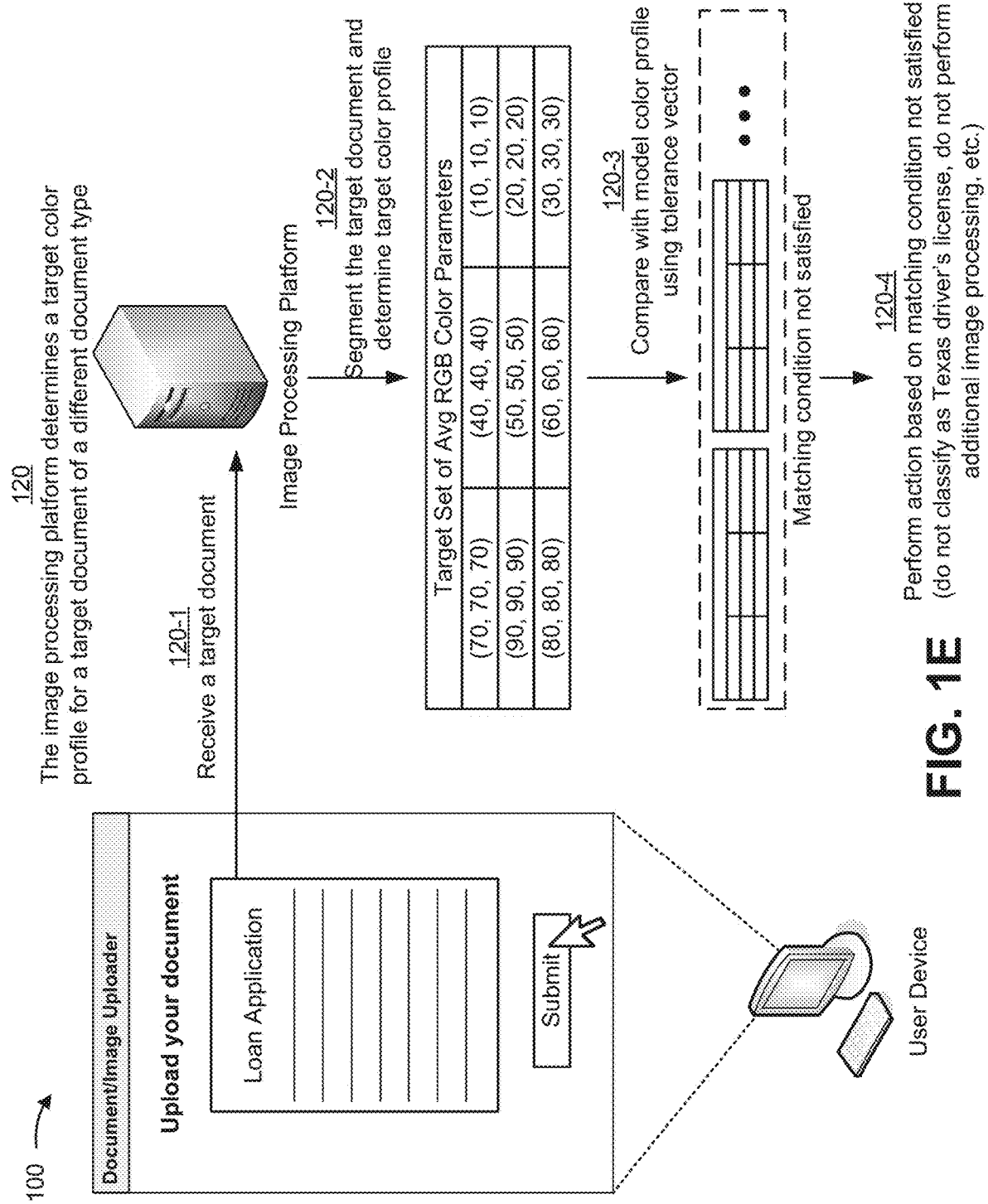

As shown in FIG. 1E, and by reference number 120, the image processing platform may determine a target color profile for a target document of a different document type than the document type the model color profile is associated with. As shown in FIG. 1E, and by reference number 120-1, a user may submit, using a user device, a target document, of a different type than the document type associated with the model color profile, to be sent to the image processing platform. Similarly to FIG. 1C, the user may use an image capture device (e.g., a camera phone, a scanner, and/or the like) to capture an image of the target document. The user device may capture the image in any one of various orientations. For example, the user may submit a driver's license in a view of 90 degrees clockwise than an upright position. In some implementations, rather than the user device capturing an image of the target document and sending that image to the image processing platform, the image processing platform may obtain the target document from an image storage device.

As shown in FIG. 1E, and by reference number 120-2, the image processing platform may segment the target document and determine a target color profile for the target document. The target color profile may include a set of average RGB color parameters for each segment, for some segments, and/or the like. The target document may be segmented in a similar way to the model color profile, such as what is shown in FIG. 1A. The image processing platform may analyze the target color profile by analyzing each segment for an average color parameter. For example, the image processing platform may determine a color profile for each pixel in a segment and determine an average color parameter based on all the pixels in the segment. The target color profile may use the same color model as the model color profile (e.g., an RGB color model, a CMYK color model, a CIE color model, a YUV color model, an HSL/HSV color model, and/or the like).

As shown in FIG. 1E, and by reference number 120-3, the image processing platform may compare the target color profile with the model color profile using the tolerance vector. For example, the image processing platform may compare the average color parameters of a segment in a target color profile and the average color parameters of a corresponding segment in the model color profile. If the value is within a particular tolerance of the model color profile (e.g., +/−0.1), the image processing platform may find a matching condition to be satisfied. The image processing platform may compare a corresponding segment, multiple corresponding segments, and/or the like to determine whether a matching condition is met. The image processing platform may compare the target color profile and the various orientations of the model color profile. For example, the image processing platform may compare the target color profile with a model set of average color parameters associated with an orientation of no rotation. If the model set associated with no rotation does not satisfy a matching condition (e.g., the model set of average color parameters for the target color profile is not within a particular tolerance of the model set of average color parameters for the model color profile), the image processing platform may compare the target color profile to a model set of a different orientation, such as a 90 degrees clockwise from upright orientation. The image processing platform may continue comparing to different orientations if the matching condition is not satisfied. Through these steps, the image processing platform may determine that the matching condition is not satisfied.

As shown in FIG. 1E, and by reference number 120-4, the image processing platform may perform an action based on the matching condition not being satisfied. For example, the image processing platform may not classify the target document as the same document type as the model document, not perform additional image processing on the target document, and/or the like. In some implementations, the target document may be sent to a storage device of unclassified documents. In some implementations, the target document's model color profile may be found to match with a model color profile of a different document type.

This may be repeated with any number of documents. Actions may proceed in a different order than described above. For example, a repository of documents that have previously been scanned and uploaded to a storage device may be used to provide the color profiles for comparison.

In this way, the image processing platform may improve the efficiency of document processing by using color recognition. In turn, this may assist in more efficiently and effectively selecting documents to be used for more sophisticated image processing, or other advanced algorithms. For example, this may conserve computing resources (e.g., processor resources, memory resources, communication resources, and/or the like) that would otherwise have been wasted in additional processing steps (e.g., sophisticated machine learning algorithms). In some implementations this may conserve computing resources that would otherwise have been wasted through inefficiency in attempting to process irregular documents, because the irregular documents may have been removed. Additionally, or alternatively, some implementations described herein may conserve computing resources that would otherwise have been used in remedying faulty or irregular results. For example, memory resources that may have been used in recovering data, processing resources that may have been used in updating a computer system because of irregular results, and/or the like may be conserved because of the reduction in irregular results.

As indicated above, FIGS. 1A-1E are provided as one or more examples. Other examples may differ from what is described with regard to FIGS. 1A-1E.

Figure 2:
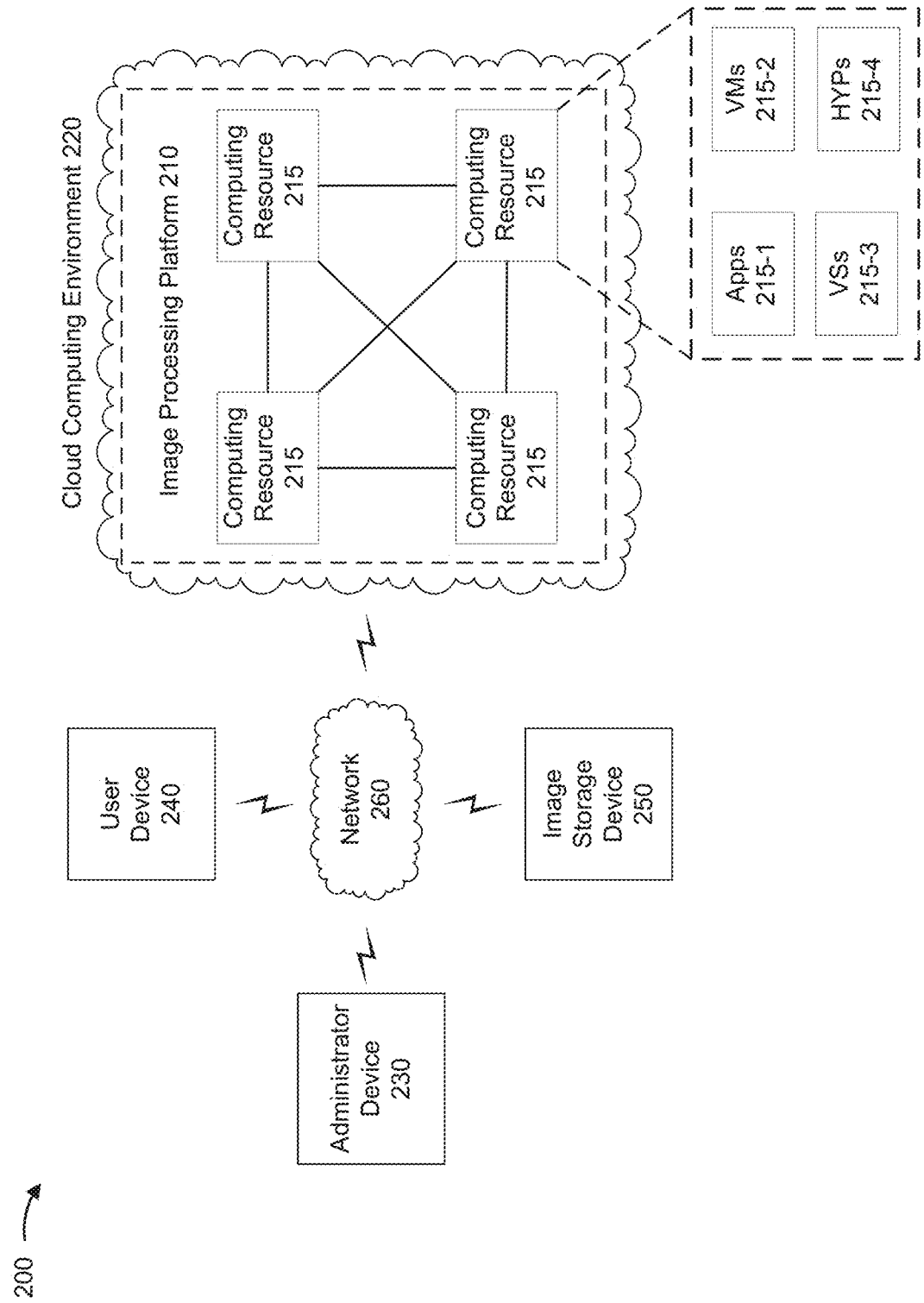
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include an image processing platform 210, a cloud computing environment 220, an administrator device 230, a user device 240, and an image storage device 250. Devices of environment 200 may interconnect via wired connections, wireless connections, or a combination of wired and wireless connections.

Image processing platform 210 includes one or more devices capable of sending, receiving, generating, storing, processing, and/or analyzing one or more images, and/or performing one or more actions based on a result of analyzing the one or more images. For example, image processing platform 210 may be a platform implemented by cloud computing environment 220 that may generate, send, receive, store, process, and/or analyze the one or more images. In some implementations, image processing platform 210 is implemented by computing resources 215 of cloud computing environment 220.

While the example environment 200 indicates that image processing platform 210 is implemented in a cloud computing environment 220, in some implementations, image processing platform 210 may be implemented by one or more devices outside of a cloud computing environment, such as a server device, a data center device, and/or the like. In some implementations, image processing platform 210 may be implemented using at least one cloud-based device and at least one non-cloud-based device.

Cloud computing environment 220 includes an environment that delivers computing as a service, whereby shared resources, services, etc. may be provided to image processing platform 210 for analyzing images. Cloud computing environment 220 may provide computation, software, data access, storage, and/or other services that do not required end-user knowledge of a physical location and configuration of a system and/or a device that delivers the services. As shown, cloud computing environment 220 may include image processing platform 210 and computing resources 215.

Computing resource 215 includes one or more personal computers, workstation computers, server devices, or another type of computation and/or communication device. In some implementations, computing resource 215 may host image processing platform 210. The cloud resources may include compute instances executing in computing resource 245, storage devices provided in computing resource 215, data transfer devices provided by computing resource 215, etc. In some implementations, computing resource 215 may include communicate with other computing resources 215 via wired connections, wireless connections, or a combination of wired and wireless connections.

As further shown in FIG. 2, computing resource 215 may include a group of closed resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 240. Application 215-1 may eliminate a need to install and execute the software applications on user device 240, and/or the like. For example, application 21501 may include software associated with human authentication platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., user device 240, etc.), and may manage infrastructure of cloud computing environment 220, such as data management, synchronization, or long-duration data transfers.

Virtualized storage 215-3 includes one or more storage systems and/or one or more devices that user virtualization techniques within the storage systems or devices of computing resource 215. In some implementations, within the context of a storage system, types of virtualizations may include block virtualization and file virtualization. Block virtualization m lay refer to abstraction (or separation) of logical storage from physical storage so that the storage system may be accessed without regard to physical storage or heterogenous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 215-4 provides hardware virtualization techniques that allow multiple operation systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

Administrator device 230 includes one or more devices capable of sending, receiving, generating, storing, processing, and/or providing information associated with generating a model color profile for a document type. For example, administrator device 230 can include a communication and/or computing device, such as a mobile phone, a laptop computer, a tablet computer, a handheld computer, a gaming device, a wearable communication device (e.g., a smart wristwatch, a pair of smart eyeglasses, etc.), or a similar type of device.

User device 240 includes one or more devices capable of sending, receiving, generating, storing, processing, and/or providing images to be classified through image processing. For example, user device 240 may include a communication and/or computing device, such as a mobile phone, a laptop computer, a tablet computer, a handheld computer, a gaming device, a wearable communication device (e.g., a smart wristwatch, a pair of smart eyeglasses, etc.), or a similar type of device.

Image storage device 250 includes one or more devices capable of sending, receiving, generating, storing, processing, and/or providing images as input to image processing platform 210. For example, image storage device 250 may include a server device, a data center device, a database management system, and/or the like. Image storage device 250 may store and/or provide images for use to train a machine learning model or to provide training images for classification.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
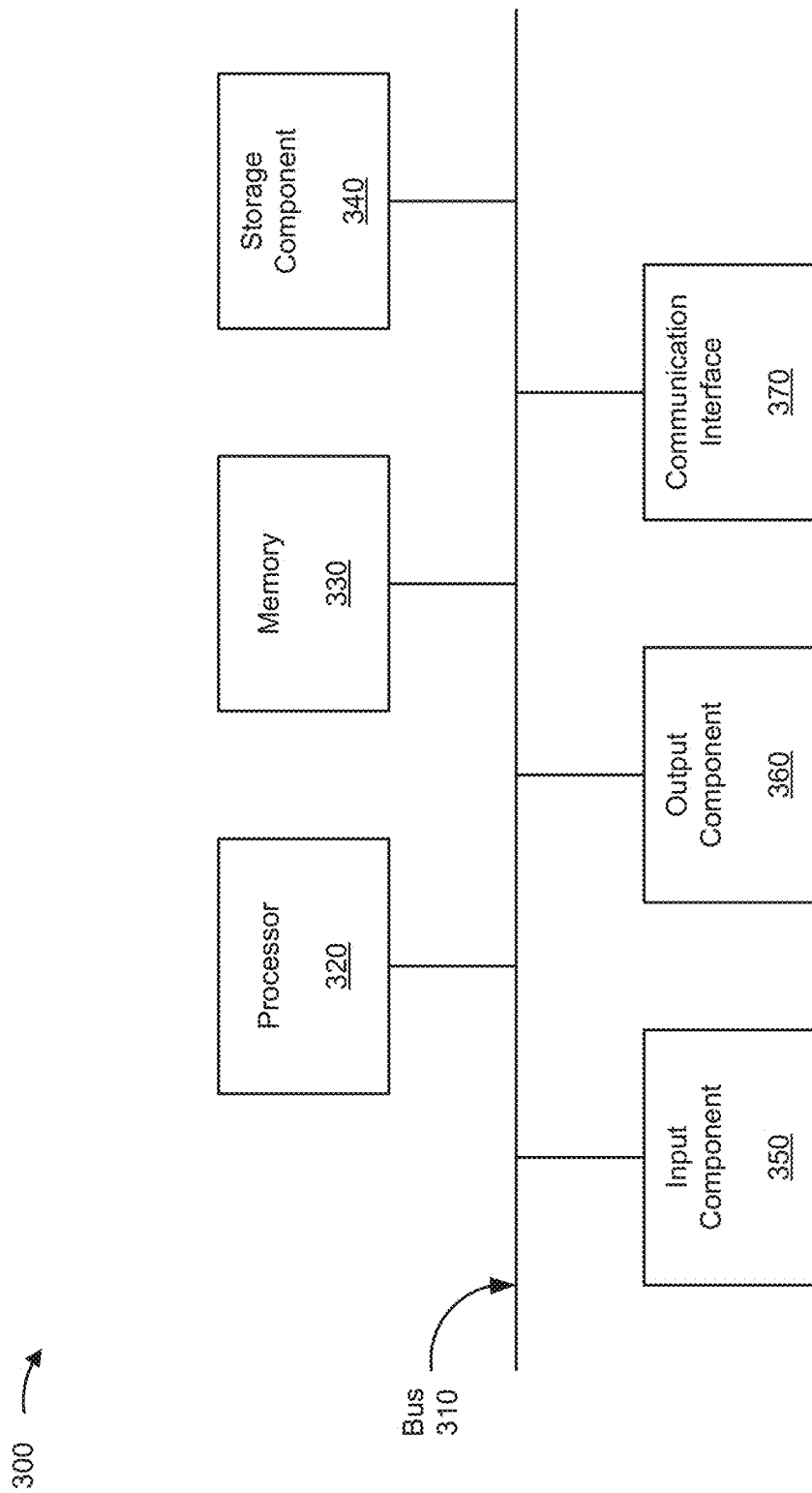
FIG. 3 is a diagram of example components of one or more devices of FIG. 2.

FIG. 3 is a diagram of example components of a device 300. Device 300 may correspond to image processing platform 210, administrator device 230, user device 240, and/or image storage device 250. In some implementations, image processing platform 210, administrator device 230, user device 240, and/or image storage device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
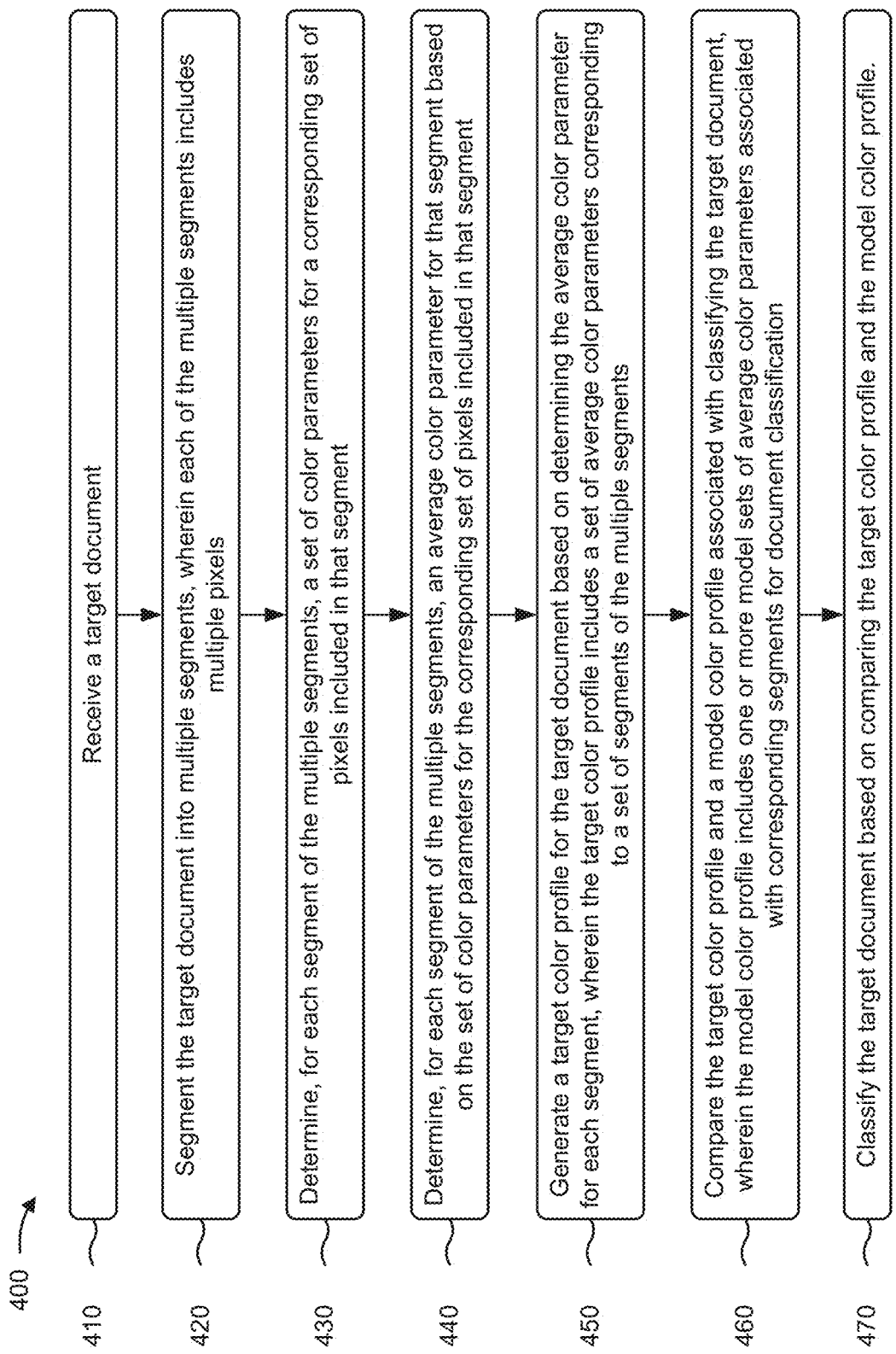
FIGS. 4-6 are flowcharts of example processes for image classification using color profiles.

FIG. 4 is a flow chart of an example process 400 for image classification using color profiles. In some implementations, one or more process blocks of FIG. 4 may be performed by a device (e.g., image processing platform 210). In some implementations, one or more process blocks of FIG. 4 may be performed by another device or a group of devices separate from or including the device, such as an administrator device (e.g., administrator device 230), a user device (e.g., user device 240), an image storage device (e.g., image storage device 250), and/or the like.

As shown in FIG. 4, process 400 may include receiving a target document (block 410). For example, the device (e.g., using computing resource 215, processor 320, memory 330, storage component 340, input component 350, output component 360, communication interface 370, and/or the like) may receive a target document, as described above.

As further shown in FIG. 4, process 400 may include segmenting the target document into multiple segments, wherein each of the multiple segments includes multiple pixels (block 420). For example, the device (e.g., using computing resource 215, processor 320, memory 330, storage component 340, input component 350, output component 360, communication interface 370, and/or the like) may segment the target document into multiple segments, as described above. In some implementations, each of the multiple segments includes multiple pixels.

As further shown in FIG. 4, process 400 may include determining, for each segment of the multiple segments, a set of color parameters for a corresponding set of pixels included in that segment (block 430). For example, the device (e.g., using computing resource 215, processor 320, memory 330, storage component 340, input component 350, output component 360, communication interface 370, and/or the like) may determine, for each segment of the multiple segments, a set of color parameters for a corresponding set of pixels included in that segment, as described above.

As further shown in FIG. 4, process 400 may include determining, for each segment of the multiple segments, an average color parameter for that segment based on the set of color parameters for the corresponding set of pixels included in that segment (block 440). For example, the device (e.g., using computing resource 215, processor 320, memory 330, storage component 340, input component 350, output component 360, communication interface 370, and/or the like) may determine, for each segment of the multiple segments, an average color parameter for that segment based on the set of color parameters for the corresponding set of pixels included in that segment, as described above.

As further shown in FIG. 4, process 400 may include generating a target color profile for the target document based on determining the average color parameter for each segment, wherein the target color profile includes a set of average color parameters corresponding to a set of segments of the multiple segments (block 450). For example, the device (e.g., using computing resource 215, processor 320, memory 330, storage component 340, input component 350, output component 360, communication interface 370, and/or the like) may generate a target color profile for the target document based on determining the average color parameter for each segment, as described above. In some implementations, the target color profile includes a set of average color parameters corresponding to a set of segments of the multiple segments.

As further shown in FIG. 4, process 400 may include comparing the target color profile and a model color profile associated with classifying the target document, wherein the model color profile includes one or more model sets of average color parameters associated with corresponding segments for document classification (block 460). For example, the device (e.g., using computing resource 215, processor 320, memory 330, storage component 340, input component 350, output component 360, communication interface 370, and/or the like) may compare the target color profile and a model color profile associated with classifying the target document, as described above. In some implementations, the model color profile includes one or more model sets of average color parameters associated with corresponding segments for document classification.

As further shown in FIG. 4, process 400 may include classifying the target document based on comparing the target color profile and the model color profile (block 470). For example, the device (e.g., using computing resource 215, processor 320, memory 330, storage component 340, input component 350, output component 360, communication interface 370, and/or the like) may classify the target document based on comparing the target color profile and the model color profile, as described above.

Process 400 may include additional implementations, such as any single implementation or any combination of implementations described below and/or in connection with one or more other processes described elsewhere herein.

In a first implementation, classifying the target document comprises: classifying the target document in a first category associated with performing further processing of the target document if the target color profile satisfies a matching condition with respect to the model color profile, or classifying the target document in a second category associated with preventing further processing of the target document if the target color profile does not satisfy the matching condition.

In a second implementation, alone or in combination with the first implementation, the matching condition is that every average color parameter, included in the set of average color parameters corresponding to the set of segments of the multiple segments of the target document, is within a respective threshold tolerance of a corresponding average color parameter included in a model set of average color parameters of the one or more model sets of average color parameters associated with the corresponding segments for document classification.

In a third implementation, alone or in combination with one or more of the first and second implementations, the one or more model sets of average color parameters include multiple model sets of average color parameters. In some implementations, each of the multiple model sets of average color parameters is associated with a different orientation of a document.

In a fourth implementation, alone or in combination with one or more of the first through third implementations, the set of color parameters includes a set of red green blue (RGB) color parameters.

In a fifth implementation, alone or in combination with one or more of the first through fourth implementations, further comprising determining a set of model parameters for the model color profile, generating the model color profile for the document type based on the set of model parameters. In some implementations, the set of model parameters is associate with a document type. In some implementations, classifying the target document comprises classifying the target document as having the document type or as not having the document type.

In a sixth implementation, alone or in combination with one or more of the first through fifth implementations, the set of model parameters associated with the document type includes at least one of: a number of segments into which documents of the document type are to be segmented, a size of a segment to be used to segment documents of the document type, one or more boundaries of a segment to be used to segment documents of the document type, or one or more tolerances to be used for comparing target documents and documents of the document type for classification.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
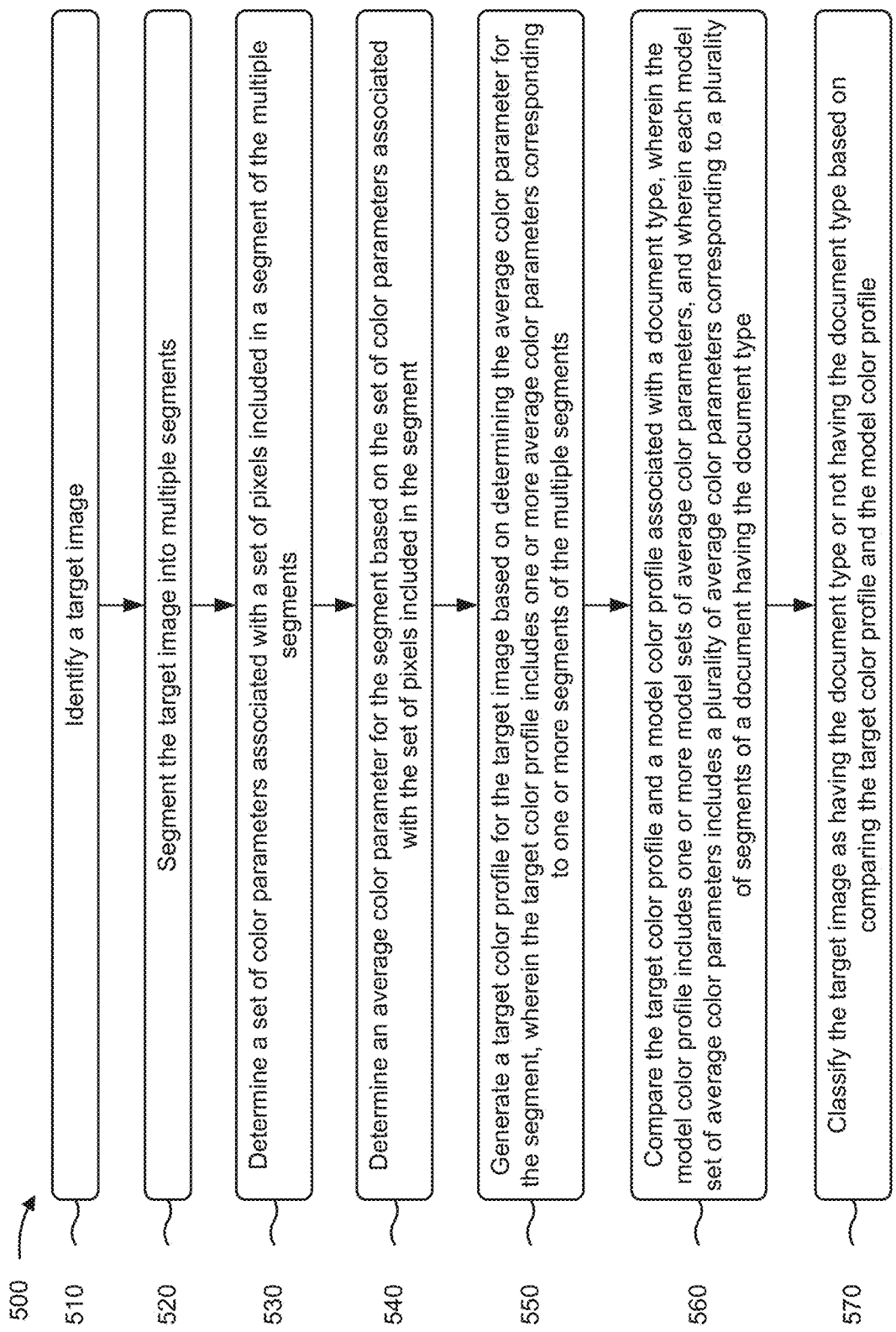

FIG. 5 is a flow chart of an example process 500 for image classification using color profiles. In some implementations, one or more process blocks of FIG. 5 may be performed by a device (e.g., image processing platform 210). In some implementations, one or more process blocks of FIG. 5 may be performed by another device or a group of devices separate from or including the device, such as an administrator device (e.g., administrator device 230), a user device (e.g., user device 240), an image storage device (e.g., image storage device 250), and/or the like.

As shown in FIG. 5, process 500 may include identifying a target image (block 510). For example, the device (e.g., using computing resource 215, processor 320, memory 330, storage component 340, input component 350, output component 360, communication interface 370, and/or the like) may identify a target image, as described above.

As shown in FIG. 5, process 500 may include segmenting the target image into multiple segments (block 520). For example, the device (e.g., using computing resource 215, processor 320, memory 330, storage component 340, input component 350, output component 360, communication interface 370, and/or the like) may segment the target image into multiple segments, as described above.

As further shown in FIG. 5, process 500 may include determining a set of color parameters associated with a set of pixels included in a segment of the multiple segments (block 530). For example, the device (e.g., using computing resource 215, processor 320, memory 330, storage component 340, input component 350, output component 360, communication interface 370, and/or the like) may determine a set of color parameters associated with a set of pixels included in a segment of the multiple segments, as described above.

As further shown in FIG. 5, process 500 may include determining an average color parameter for the segment based on the set of color parameters associated with the set of pixels included in the segment (block 540). For example, the device (e.g., using computing resource 215, processor 320, memory 330, storage component 340, input component 350, output component 360, communication interface 370, and/or the like) may determine an average color parameter for the segment based on the set of color parameters associated with the set of pixels included in the segment, as described above.

As further shown in FIG. 5, process 500 may include generating a target color profile for the target image based on determining the average color parameter for the segment, wherein the target color profile includes one or more average color parameters corresponding to one or more segments of the multiple segments (block 550). For example, the device (e.g., using computing resource 215, processor 320, memory 330, storage component 340, input component 350, output component 360, communication interface 370, and/or the like) may generate a target color profile for the target image based on determining the average color parameter for the segment, as described above. In some implementations, the target color profile includes one or more average color parameters corresponding to one or more segments of the multiple segments.

As further shown in FIG. 5, process 500 may include comparing the target color profile and a model color profile associated with a document type, wherein the model color profile includes one or more model sets of average color parameters, and wherein each model set of average color parameters includes a plurality of average color parameters corresponding to a plurality of segments of a document having the document type (block 560). For example, the device (e.g., using computing resource 215, processor 320, memory 330, storage component 340, input component 350, output component 360, communication interface 370, and/or the like) may compare the target color profile and a model color profile associated with a document type, as described above. In some implementations, the model color profile includes one or more model sets of average color parameters. In some implementations, each model set of average color parameters includes a plurality of average color parameters corresponding to a plurality of segments of a document having the document type.

As further shown in FIG. 5, process 500 may include classifying the target image as having the document type or not having the document type based on comparing the target color profile and the model color profile (block 570). For example, the device (e.g., using computing resource 215, processor 320, memory 330, storage component 340, input component 350, output component 360, communication interface 370, and/or the like) may classify the target image as having the document type or not having the document type based on comparing the target color profile and the model color profile, as described above.

Process 500 may include additional implementations, such as any single implementation or any combination of implementations described below and/or in connection with one or more other processes described elsewhere herein.

In a first implementation, process 500, when comparing the target color profile and the model color profile, may include determining whether the target color profile satisfies a matching condition with respect to the model color profile. In some implementations, process 500, when classifying the target image, may include classifying the target image as having the document type if the matching condition is satisfied or classify the target image as not having the document type if the matching condition is not satisfied.

In a second implementation, alone or in combination with the first implementation, the model color profile is associated with a set of threshold tolerance values corresponding to a model set of average color parameters of the one or more model sets of average color parameters. In some implementations, process 500, when determining whether the target color profile satisfies the matching condition with respect to the model color profile, may include determining a threshold tolerance value for the segment based on the set of threshold tolerances, and determining whether an average color parameter for the segment is within the threshold tolerance value of a corresponding average color parameter, included in the one or more model sets of average color parameters, for the segment.

In a third implementation, alone or in combination with one or more of the first and second implementations, the set of threshold tolerance values includes different tolerance values for different segments.

In a fourth implementation, alone or in combination with one or more of the first through third implementations, process 500, when comparing the target color profile and the model color profile, may include skipping a comparison for the segment if the threshold tolerance value for the segment is equal to a predefined value.

In a fifth implementation, alone or in combination with one or more of the first through fourth implementations, when selectively performing image processing associated with the target image based on classifying the target image, the image processing may be performed if the target image is classified as having the document type or is not performed if the target image is classified as not having the document type.

In a sixth implementation, alone or in combination with one or more of the first through fifth implementations, process 500, when classifying the target image, may include stopping the comparison and classifying the target image as not having the document type upon determining that the average color parameter for the segment does not satisfy a matching condition associated with a corresponding average color parameter, included in the one or more model sets of average color parameters, for the segment.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
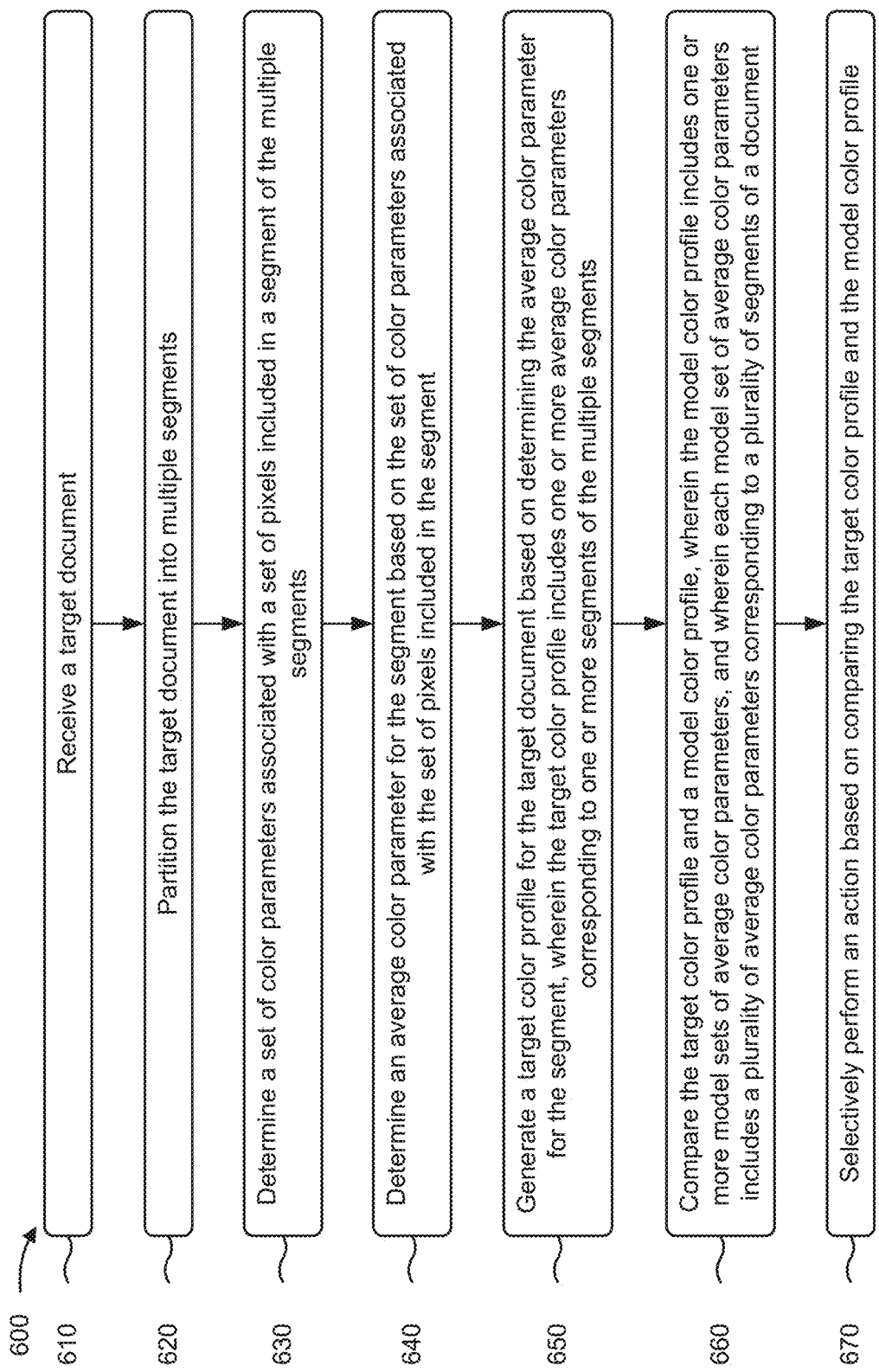

FIG. 6 is a flow chart of an example process 600 for image classification using color profiles. In some implementations, one or more process blocks of FIG. 6 may be performed by a device (e.g., image processing platform 210). In some implementations, one or more process blocks of FIG. 6 may be performed by another device or a group of devices separate from or including the device, such as an administrator device (e.g., administrator device 230), a user device (e.g., user device 240), an image storage device (e.g., image storage device 250), and/or the like.

As shown in FIG. 6, process 600 may include receiving a target document (block 610). For example, the device (e.g., using computing resource 215, processor 320, memory 330, storage component 340, input component 350, output component 360, communication interface 370, and/or the like) may receive a target document, as described above.

As further shown in FIG. 6, process 600 may include partitioning the target document into multiple segments (block 620). For example, the device (e.g., using computing resource 215, processor 320, memory 330, storage component 340, input component 350, output component 360, communication interface 370, and/or the like) may partition the target document into multiple segments, as described above.

As further shown in FIG. 6, process 600 may include determining a set of color parameters associated with a set of pixels included in a segment of the multiple segments (block 630). For example, the device (e.g., using computing resource 215, processor 320, memory 330, storage component 340, input component 350, output component 360, communication interface 370, and/or the like) may determine a set of color parameters associated with a set of pixels included in a segment of the multiple segments, as described above.

As further shown in FIG. 6, process 600 may include determining an average color parameter for the segment based on the set of color parameters associated with the set of pixels included in the segment (block 640). For example, the device (e.g., using computing resource 215, processor 320, memory 330, storage component 340, input component 350, output component 360, communication interface 370, and/or the like) may determine an average color parameter for the segment based on the set of color parameters associated with the set of pixels included in the segment, as described above.

As further shown in FIG. 6, process 600 may include generating a target color profile for the target document based on determining the average color parameter for the segment, wherein the target color profile includes one or more average color parameters corresponding to one or more segments of the multiple segments (block 650). For example, the device (e.g., using computing resource 215, processor 320, memory 330, storage component 340, input component 350, output component 360, communication interface 370, and/or the like) may generate a target color profile for the target document based on determining the average color parameter for the segment, as described above. In some implementations, the target color profile includes one or more average color parameters corresponding to one or more segments of the multiple segments.

As further shown in FIG. 6, process 600 may include comparing the target color profile and a model color profile, wherein the model color profile includes one or more model sets of average color parameters, and wherein each model set of average color parameters includes a plurality of average color parameters corresponding to a plurality of segments of a document (block 660). For example, the device (e.g., using computing resource 215, processor 320, memory 330, storage component 340, input component 350, output component 360, communication interface 370, and/or the like) may compare the target color profile and a model color profile, as described above. In some implementations, the model color profile includes one or more model sets of average color parameters. In some implementations, each model set of average color parameters includes a plurality of average color parameters corresponding to a plurality of segments of a document.

As further shown in FIG. 6, process 600 may include selectively performing an action based on comparing the target color profile and the model color profile (block 670). For example, the device (e.g., using computing resource 215, processor 320, memory 330, storage component 340, input component 350, output component 360, communication interface 370, and/or the like) may selectively perform an action based on comparing the target color profile and the model color profile, as described above.

Process 600 may include additional implementations, such as any single implementation or any combination of implementations described below and/or in connection with one or more other processes described elsewhere herein.

In a first implementation, process 600, when selectively performing the action, may include: classifying the target document as having a document type, associated with the model color profile, or not having the document type based on comparing the target color profile and the model color profile; performing image processing on the target document or refraining from performing image processing on the target document based on comparing the target color profile and the model color profile; or marking the target document for image processing or marking the target document to prevent image processing based on comparing the target color profile and the model color profile.

In a second implementation, alone or in combination with the first implementation, the one or more model sets of average color parameters includes four sets of average color parameters. In some implementations, each of the four sets of average color parameters is associated with a different ninety-degree rotation of a document having the document type.

In a third implementation, alone or in combination with one or more of the first and second implementations, process 600 includes analyzing a plurality of documents tagged with a document type; determining a set of model parameters for the model color profile based on analyzing the plurality of documents; and generating the model color profile for the document type based on the set of model parameters. In some implementations, the set of model parameters is being associated with the document type. In some implementations, process 600, when selectively performing the action, may include classifying the target document as having the document type or as not having the document type based on comparing the target color profile and the model color profile.

In a fourth implementation, alone or in combination with one or more of the first through third implementations, the set of model parameters includes at least one of: a number of segments into which documents of the document type are to be segmented, a size of one or more segments to be used to segment documents of the document type, one or more boundaries of the one or more segments to be used to segment documents of the document type, or one or more tolerances to be used for comparing target documents and documents of the document type for classification.

In a fifth implementation, alone or in combination with one or more of the first through fourth implementations, process 600, when comparing the target color profile and the model color profile, may further include stopping the comparison based on determining that the average color parameter for the segment does not satisfy a matching condition associated with a corresponding average color parameter, included in the one or more model sets of average color parameters, for the segment.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
generating, by a device, a target color profile for a target document based on determining an average color parameter for a segment associated with the target color profile;
determining, by the device, whether the target color profile satisfies a matching condition with respect to a model color profile,
wherein the matching condition is satisfied when the average color parameter, is within a respective threshold tolerance of a corresponding average color parameter included in a model set of average color parameters of one or more model sets of average color parameters associated with corresponding segments for document classification; and
classifying, by the device, the target document based on determining whether the target color profile satisfies the matching condition.

2. The method of claim 1, wherein generating the target color profile further comprises:
segmenting the target document into one or more segments including the segment associated with the target color profile.

3. The method of claim 1, wherein generating the target color profile comprises:
determining a color profile for each pixel in the segment associated with the target color profile, and
determining the average color parameter based one determining the color profile for each pixel in the segment associated with the target color profile.

4. The method of claim 1, wherein determining whether the target color profile satisfies the matching condition comprises:
determining the target color profile satisfies the matching condition using a tolerance vector.

5. The method of claim 1, further comprising:
comparing the target color profile to a model color profile associated with a different orientation.

6. The method of claim 1, wherein classifying the target document comprises:
classifying the target document with a document type associated with the model color profile.

7. The method of claim 1, further comprising:
generating the model color profile.

8. A device, comprising:
one or more memories; and
one or more processors, coupled to the one or more memories, configured to:
generate a target color profile for a target document based on determining an average color parameter for a segment associated with the target color profile;
determine whether the target color profile satisfies a matching condition with respect to a model color profile,
wherein the matching condition is satisfied when the average color parameter, is within a respective threshold tolerance of a corresponding average color parameter included in a model set of average color parameters of one or more model sets of average color parameters associated with corresponding segments for document classification; and
classify the target document based on determining whether the target color profile satisfies the matching condition.

9. The device of claim 8, wherein the one or more processors, to generate the target color profile, are configured to:
segment the target document into one or more segments including the segment associated with the target color profile, and
determine the average color parameter for the segment associated with the target color profile.

10. The device of claim 8, wherein the one or more processors, to generate the target color profile, are configured to:
determine a color profile for each pixel in the segment associated with the target color profile, and
determine the average color parameter based one determining the color profile for each pixel in the segment associated with the target color profile.

11. The device of claim 8, wherein the one or more processors, to determine whether the target color profile satisfies the matching condition, are configured to:
determine the target color profile satisfies the matching condition using a tolerance vector.

12. The device of claim 8, wherein the one or more processors are further configured to:
compare the target color profile to a model color profile associated with a different orientation.

13. The device of claim 8, wherein the one or more processors, to classify the target document, are configured to:
classify the target document with a document type associated with the model color profile.

14. The device of claim 8, wherein the one or more processors are further configured to:
generate the model color profile.

15. A non-transitory computer-readable medium storing a set of instructions, the set of instructions comprising:
one or more instructions that, when executed by one or more processors of a device, cause the device to:
generate a target color profile for a target document based on determining an average color parameter for a segment associated with the target color profile;
determine whether the target color profile satisfies a matching condition with respect to a model color profile,
wherein the matching condition is satisfied when the average color parameter, is within a respective threshold tolerance of a corresponding average color parameter included in a model set of average color parameters of one or more model sets of average color parameters associated with corresponding segments for document classification; and
classify the target document based on determining whether the target color profile satisfies the matching condition.

16. The non-transitory computer-readable medium of claim 15, wherein the one or more instructions, that cause the device to generate the target color profile, cause the device to:
determine a color profile for each pixel in the segment associated with the target color profile, and determine the average color parameter based one determining the color profile for each pixel in the segment associated with the target color profile.

17. The non-transitory computer-readable medium of claim 15, wherein the one or more instructions, that cause the device to determine whether the target color profile satisfies the matching condition, cause the device to:
   determine the target color profile satisfies the matching condition using a tolerance vector.

18. The non-transitory computer-readable medium of claim 15, wherein the one or more instructions further cause the device to:
   compare the target color profile to a model color profile associated with a different orientation.

19. The non-transitory computer-readable medium of claim 15, wherein the one or more instructions, that cause the device to classify the target document, cause the device to:
   classify the target document with a document type associated with the model color profile.

20. The non-transitory computer-readable medium of claim 15, wherein the one or more instructions further cause the device to:
   generate the model color profile.

\* \* \* \* \*